United States Patent
Ravindranath Sivalingam et al.

(10) Patent No.: US 9,405,654 B2
(45) Date of Patent: Aug. 2, 2016

(54) MONITORING MOBILE APPLICATION PERFORMANCE

(71) Applicant: Microsoft Corporation, Redmond, WA (US)

(72) Inventors: Lenin Ravindranath Sivalingam, Redmond, WA (US); Jitendra D. Padhye, Redmond, WA (US); Sharad Agarwal, Seattle, WA (US); Ratul Mahajan, Seattle, WA (US); Ian Obermiller, Seattle, WA (US); Shahin Shayandeh, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/923,187

(22) Filed: Jun. 20, 2013

(65) Prior Publication Data

US 2014/0380282 A1    Dec. 25, 2014

(51) Int. Cl.
*G06F 9/44*     (2006.01)
*G06F 11/34*    (2006.01)
*G06F 11/36*    (2006.01)

(52) U.S. Cl.
CPC ........ *G06F 11/3476* (2013.01); *G06F 11/3466* (2013.01); *G06F 11/3644* (2013.01)

(58) Field of Classification Search
CPC ............ H04L 43/0852; H04L 43/0829; H04L 43/087; H04L 43/16; H04L 65/1069; H04L 47/2433; H04L 47/2441; H04L 47/283; H04L 47/745; H04L 63/0272; G06F 11/3466; G06F 11/3467; G06F 11/3644

USPC .......................................... 717/127, 128, 130
See application file for complete search history.

(56) References Cited

U.S. PATENT DOCUMENTS

| | | | |
|---|---|---|---|
| 6,327,699 B1 * | 12/2001 | Larus et al. | 717/128 |
| 6,754,890 B1 * | 6/2004 | Berry et al. | 717/128 |
| 7,386,839 B1 * | 6/2008 | Golender et al. | 717/131 |
| 7,506,318 B1 | 3/2009 | Lindo et al. | |
| 7,657,876 B2 * | 2/2010 | Chilimbi | 717/132 |
| 7,788,644 B2 * | 8/2010 | Koduru et al. | 717/127 |
| 8,271,837 B2 * | 9/2012 | Prophete et al. | 714/38.1 |
| 8,312,435 B2 * | 11/2012 | Wygodny et al. | 717/130 |
| 8,776,027 B2 * | 7/2014 | Ergan et al. | 717/127 |
| 2008/0301417 A1 | 12/2008 | Law et al. | |
| 2012/0023377 A1 * | 1/2012 | Garskof | 714/48 |
| 2013/0263095 A1 * | 10/2013 | He et al. | 717/129 |

OTHER PUBLICATIONS

Schmidt et al., Monitoring Smartphones for Anomaly Detection, Mobile Netw Appl (2009), 14:92-106.*

(Continued)

*Primary Examiner* — Anna Deng
(74) *Attorney, Agent, or Firm* — Alin Corie; Sandy Swain; Micky Minhas

(57) ABSTRACT

Aspects of the subject disclosure are directed towards monitoring application performance during actual use, particularly mobile application performance. Described is instrumenting mobile application binaries to automatically identify a critical path in user transactions, including across asynchronous-call boundaries. Trace data is logged by the instrumented application to capture UI manipulations, thread execution, asynchronous calls and callbacks, UI updates and/or thread synchronization. The trace data is analyzed to assist developers in improving application performance.

20 Claims, 10 Drawing Sheets

(56) References Cited

OTHER PUBLICATIONS

"International Preliminary Report on Patentability Issued in PCT Application No. PCT/US2014/042794", Mailed Date: Sep. 21, 2015, 8 Pages.

"International Search Report & Written Opinion for PCT Application No. PCT/US2014/042794", Mailed Date: Oct. 8, 2014, 10 Pages.

Ravindranath, et al., "AppInsight: Mobile App Performance Monitoring in the Wild", In Proceedings of the 10th USENIX Conference on Operating Systems Design and Implementation, Oct. 8, 2012, 14 Pages.

Zhu, et al., "Lightweight Online Performance Monitoring and Tuning with Embedded Gossip", In IEEE Transactions on Parallel and Distributed Systems, vol. 20, Issue 7, Jul. 1, 2009, 12 Pages.

\* cited by examiner

MONITORING MOBILE APPLICATION PERFORMANCE

BACKGROUND

There are currently over a million mobile applications in various application marketplaces. Users rely on these applications for a wide variety of tasks, such as posting comments on social networking sites, conducting online banking and so forth.

The mobile-application marketplace is highly competitive. As a result, developers strive to maintain and improve the quality of their applications. Lab testing provides some guidance, but is seldom sufficient, as mobile applications are highly interactive and a full range of user interactions are difficult to simulate in a lab. Further, mobile applications experience a wide variety of environmental conditions "in the field," such as network connectivity (Wi-Fi or 3G), GPS-signal quality, and phone hardware, which can vary widely among actual users. Other conditions also factor in, e.g., some platform APIs change their behavior depending on the battery level. Such diverse conditions are difficult to reproduce in a lab.

As a result, to improve the quality of an application, the application developer/team needs to understand how an application performs in the field. However, the asynchronous, multi-threaded nature of mobile applications makes tracing application usage and application performance to gather data difficult. The difficulties are compounded by the resource limitations inherent in the mobile platform, e.g., adding tracing code that assists in monitoring application performance cannot adversely impact the user experience.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology in which application code is automatically instrumented, including inserting one or more logging functions and one or more event handlers into the application code to log events. Also described is inserting code into the application code to assign an identifier for an invocation of an asynchronous call and detour the callback provided to the asynchronous call to detour code to associate the callback with the asynchronous call based upon the identifier.

In one aspect, an instrumenter is configured to instrument application code with logging functionality and with code that associates asynchronous calls with callbacks. An analysis component processed data logged during execution of the application code via the logging functionality into directed acyclic graphs representing one or more transactions that occurred during execution.

In one aspect, during executing of instrumented application code, trace data is logged via the instrumented application code. The trace data corresponds to at least one of: user interface (UI) manipulations, thread execution, asynchronous calls and callbacks, UI updates or thread synchronization. The trace data is uploaded for analysis processing.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards monitoring mobile application performance, including by instrumenting mobile application code (binaries) to collect trace data (traces). The traces are analyzed to automatically identify a critical path in user transactions, including across asynchronous-call boundaries, where in general user-perceived latency is set forth in the concept of a critical path, in that a critical path provides the bottleneck path in a user transaction, such that changing the length of any part of the critical path changes the user-perceived latency. In general, the critical path starts with a user manipulation event, and ends with a UI update event. A user "transaction" as described herein begins with a user manipulation of the UI, and ends with completion of the synchronous and asynchronous tasks (threads) in the application that were triggered by the manipulation. As will be understood, many intermediary actions may be taken during a transaction.

In one aspect, a lightweight instrumentation system is provided that does not require input from the developer, nor any changes to the operating system. In one implementation, the instrumentation mechanism instruments mobile applications generally by interposing on event handlers. Performance data is collected in the field, and may be uploaded to a central server for offline analysis.

As will be understood, the instrumentation system described herein helps application developers diagnose performance bottlenecks and failures experienced by their applications in the field. The instrumentation mechanism provides developers with information on a critical path through the code for user transactions. This information generally may be used to point the developer to optimizations needed for improving the user experience.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and imaging technology in general.

Figure 1:
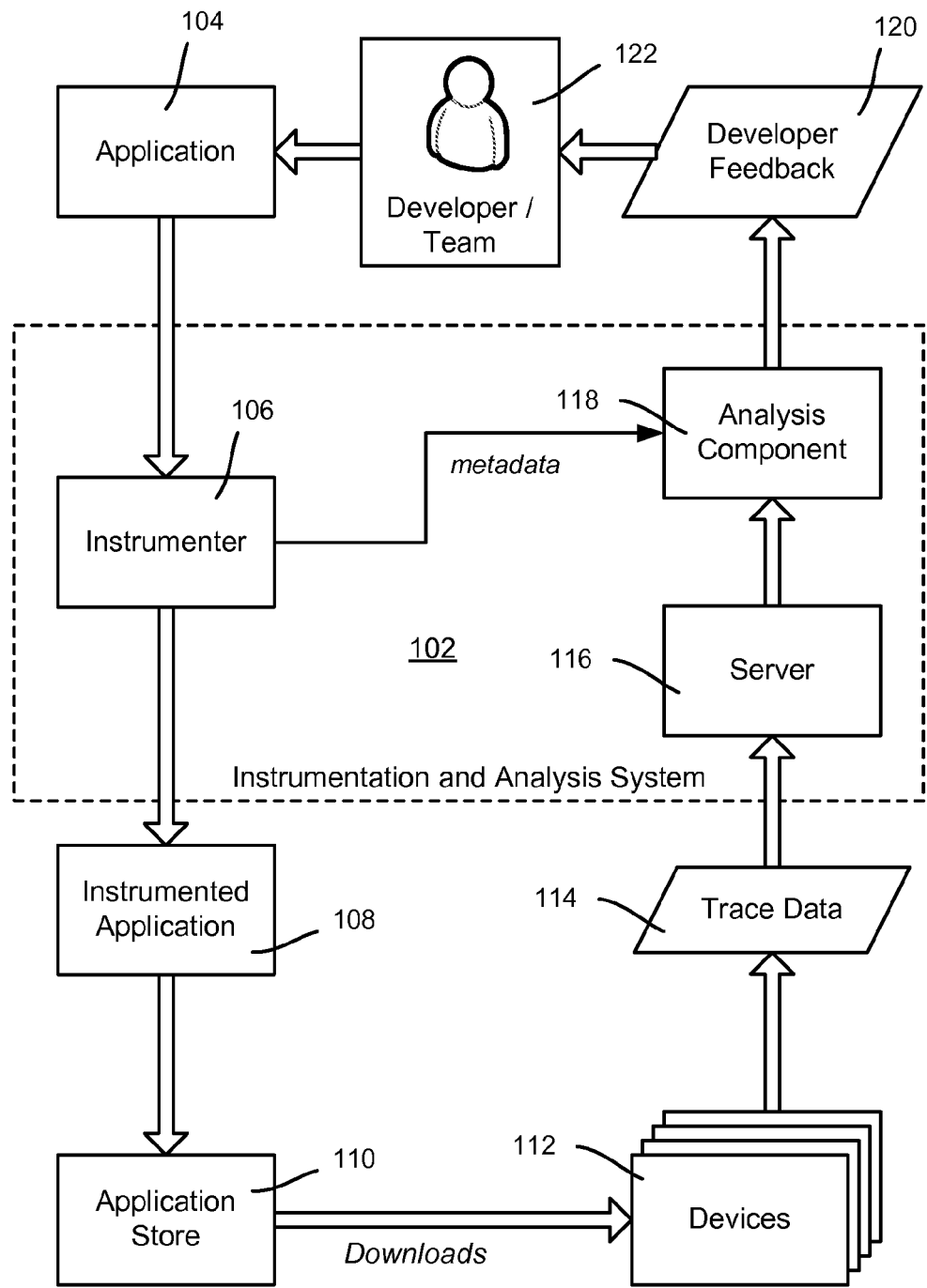
FIG. 1 is a block diagram showing various example components including an Instrumentation and analysis system that monitors mobile application performance, according to one or more example embodiments.

FIG. 1 is a block diagram showing example concepts related to one implementation (e.g., an architecture) of an instrumentation and analysis system 102 based upon the technology described herein. The exemplified system 102 captures, with relatively minimal overhead, the information needed to build execution traces of user transactions and identify their critical paths and exception paths. Note that in deciding what to capture, there is a tradeoff between the overhead and the ability to give useful feedback to the developer.

As shown in FIG. 1, an application 104 (e.g., a binary) is instrumented using an instrumentation tool (an instrumenter 106) into an instrumented application 108 as described herein. Note that while an application binary is used to describe the technology, any code may benefit from the technology described herein, e.g., an operating system component, a service, and so on may be similarly instrumented and analyzed, even if not technically considered an application.

In one implementation, the developer only needs to provide the instrumenter 106 with application binaries; no other input or source code annotation is needed. For a phone application, the instrumenter 106 leverages the fact that phone applications are often written using higher-level frameworks and compiled to an intermediate language (byte code). For example, one or more implementations are designed for applications written using the Silverlight® framework (used by most application in the Windows®-phone marketplace) and compiled to MSIL (Microsoft® Intermediate Language) byte code. MSIL preserves the structure of the program, including types, methods and inheritance information.

Users obtain instances of the instrumented application 108 from an application store 110. When users run the instrumented application 108 on their devices 112 in the field, trace data 114 is collected and uploaded to a server 116. For example, in a Windows®-based phone, the background transfer service (BTS) may be used to upload the trace data 114; in general, BTS uploads the data when no foreground applications are running, and provides a reliable transfer service in the face of network outages and losses.

A number of factors affect the performance of mobile application, including user input, environmental conditions, and so forth. The application-execution trace may be captured in varying degrees of detail.

The trace data is analyzed by an analysis component 118, and the findings/developer feedback 120 are made available to a developer/team 122, e.g., via a web-based interface. The developer/team 122 may then improve the application, e.g., via an updated version. The knowledge learned also may be able to improve other applications.

In general, the trace data 114 corresponds to a need to capture various categories of data, including when the user manipulates the UI; when the application code executes on various threads, and causality between asynchronous calls and callbacks. Other categories include data related to thread synchronization points (e.g., throughWait calls) and their causal relationship, when the UI was updated, and any unhandled exceptions.

Additional data may be captured for analysis. For example, for certain asynchronous calls such as web requests and GPS calls, additional information may be collected at the call and at the callback. As more particular examples, for web request calls, the URL and the network state may be logged; for GPS calls, the state of the GPS may be logged. The choice of the information to log may be guided by experience and the tradeoff between completeness and overhead. Actual data shows that critical paths in a user transaction often involve either network or GPS accesses. By logging a small amount of additional information at certain points, additional meaningful feedback may be provided to the developer.

Figure 2:
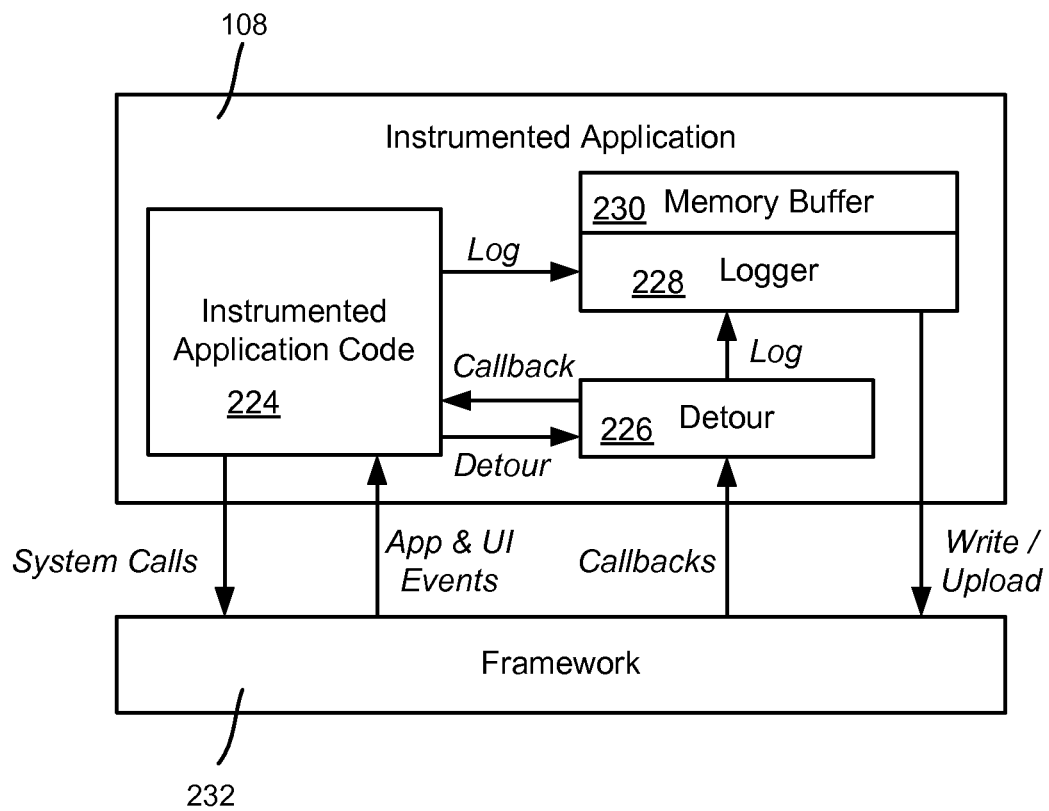
FIG. 2 is a block diagram showing a structure of instrumenting of an application via logger and detour libraries, according to one or more example embodiments.

To collect the data, the application may be instrumented in various steps. In one implementation, the application binary is first read, assigning a unique identifier to methods in the application code and to system calls. Each call site is considered unique; e.g., if X is called twice, each call site gets its own identifier. This mapping is stored in metadata (e.g., in a metadata file and uploaded to the analysis component 118 for later use. Another step links libraries to the instrumented application code 224, including a detour library 226 and a logger library 228, as generally represented in FIG. 2. The detour library 226 (based on known technology) is dynamically generated during instrumentation, and exports a series of detouring functions that help attribute callback executions to the asynchronous calls that triggered them. The logger library 228 exports logging functions and event handlers that insert trace records into a memory buffer 230. Each record is tagged with a timestamp and the identifier of the thread that called the logging function. The memory buffer 230 is flushed to stable storage to prevent overflow as needed. When the application exits, the memory buffer 230 is scheduled for upload using BTS.

Further, the application is instrumented with calls to methods in the logger library 228 and detour library 226 from appropriate places to collect the desired data. An example of this process is provided via the code fragment shown below in Table 1, and the corresponding transaction diagram in FIG. 3.

TABLE 1

```
void btnFetch_Click(
        object obj, RoutedEventArgs e) {
    var req = WebRequest.Create(url);
    req.BeginGetResponse(reqCallback, null);
}
void reqCallback(IAsyncResult result) {
    /* Process */
    UIDispatcher.BeginInvoke(updateUI);
}
void updateUI( ) {
    /* Update UI */
}
```

In general, the user inputs UI manipulation events, which are captured when the user interacts with the UI (touch, flick, and so forth). The underlying framework 232 (FIG. 2) delivers the UI input events on the UI thread of the application running in the foreground. A first event in this series is a ManipulationStarted event, and the last is a Manipulation-Ended event. Any application-specified handler to handle a UI event is also called on the UI thread in between these two events. For example, in the above code in Table 1, btnFetch Click handles the click event for a button. When the user touches the button on the screen, the handler is called in between the two manipulation events.

The logger library 228 exports handlers for Manipulation-Started and Manipulation Ended events, which are added to the application's code, as generally shown below in the instrumented code of Table 2. The handlers log the times of the events, which allows matching the UI manipulation to the correct application handler for that UI input.

TABLE 2

```
void btnFetch_Click(
        object obj, RoutedEventArgs e) {
    + Logger.LogUpcallStart(5);
    var req = WebRequest.Create(url);
    * Detour dt = DetourFactory.GetDetour(reqCallback, 7);
    * Logger.LogCallStart(7);
    req.BeginGetResponse(dt.Cb1, null);
    * Logger.LogCallEnd(7);
    + Logger.LogUpcallEnd(5);
}
void reqCallback(IAsyncResult result) {
    + Logger.LogUpcallStart(19);
    /* Process */
    * Detour dt = DetourFactory.GetDetour(updateUI, 13);
    * Logger.LogCallStart(13);
    UIDispatcher.BeginInvoke(dt.Cb2);
    * Logger.LogCallEnd(13);
    + Logger.LogUpcallEnd(19);
}
void updateUI( ) {
    + Logger.LogUpcallStart(21);
    /* Update UI */
    + Logger.LogUpcallEnd(21);
}
```

Table 2 shows the instrumented version of the code in Table 1. Note that the actual instrumentation is done on MSIL byte code, however for readability purposes, decompiled C# code is shown.

Figure 3:
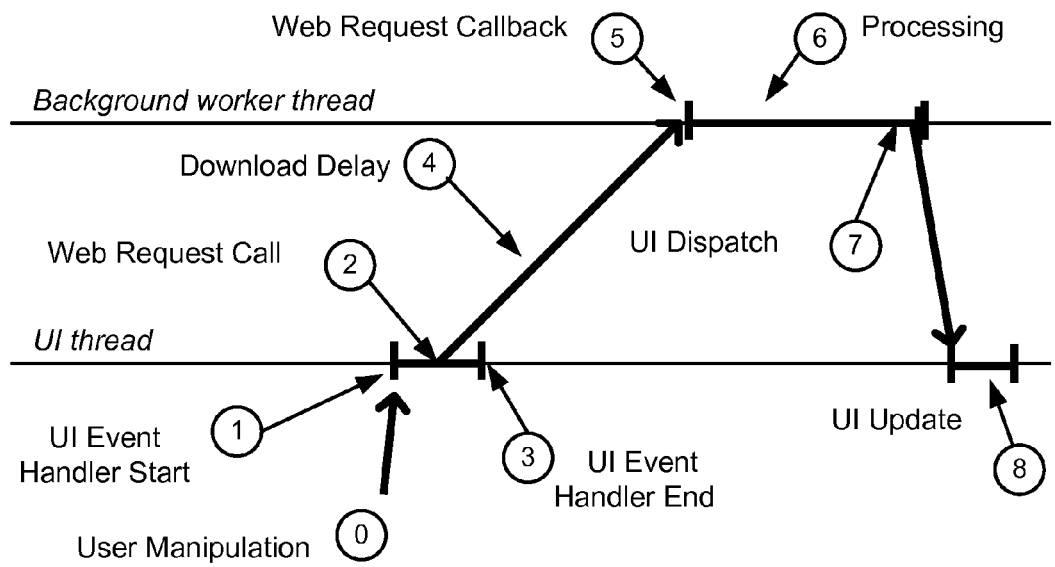
FIG. 3 is an example execution trace for example code showing a user transaction, according to one or more example embodiments.
Figure 4:
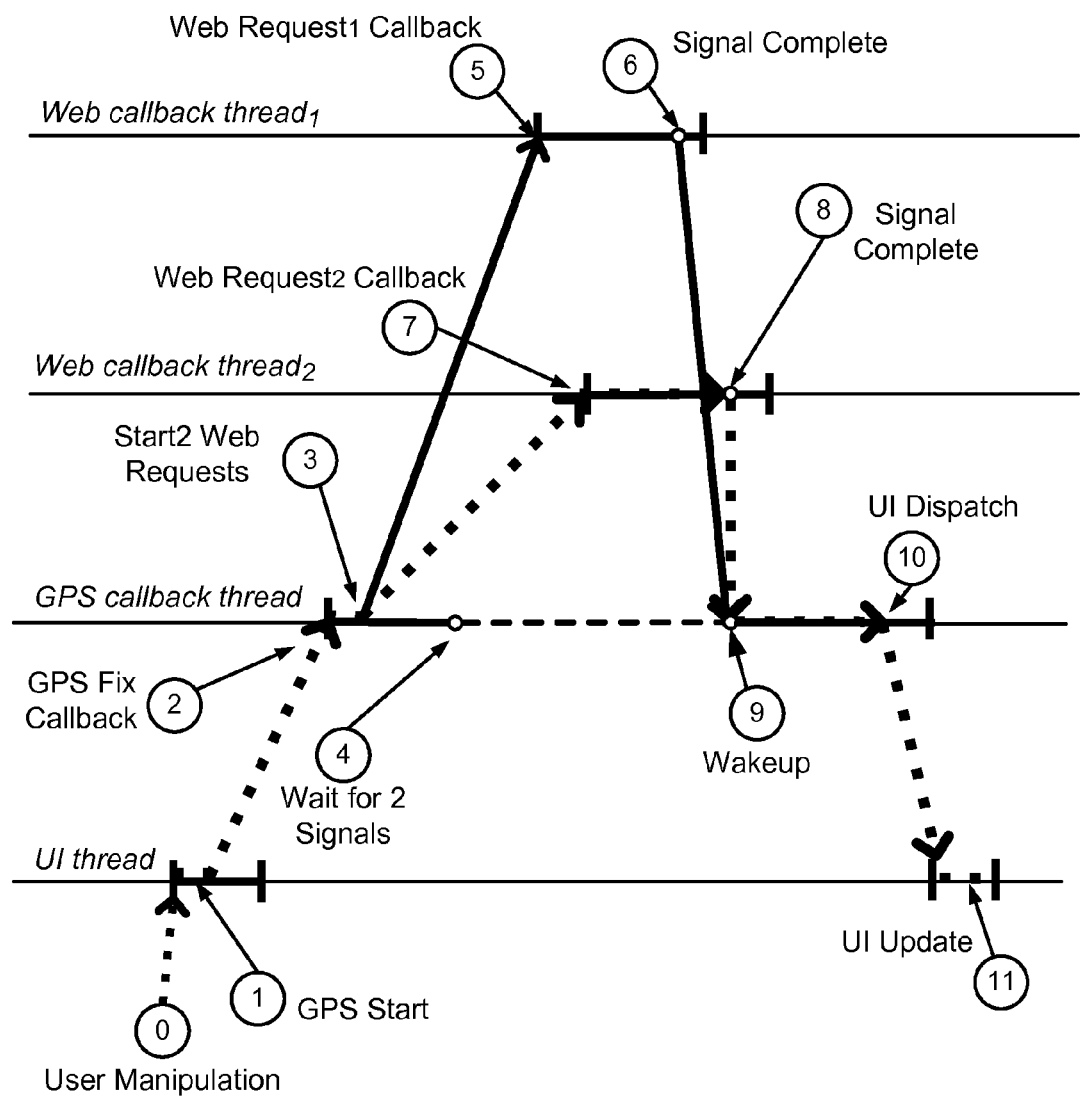
FIG. 4 is an example execution trace for example location-based application code showing a user transaction and a critical path therein, according to one or more example embodiments.
Figure 5:
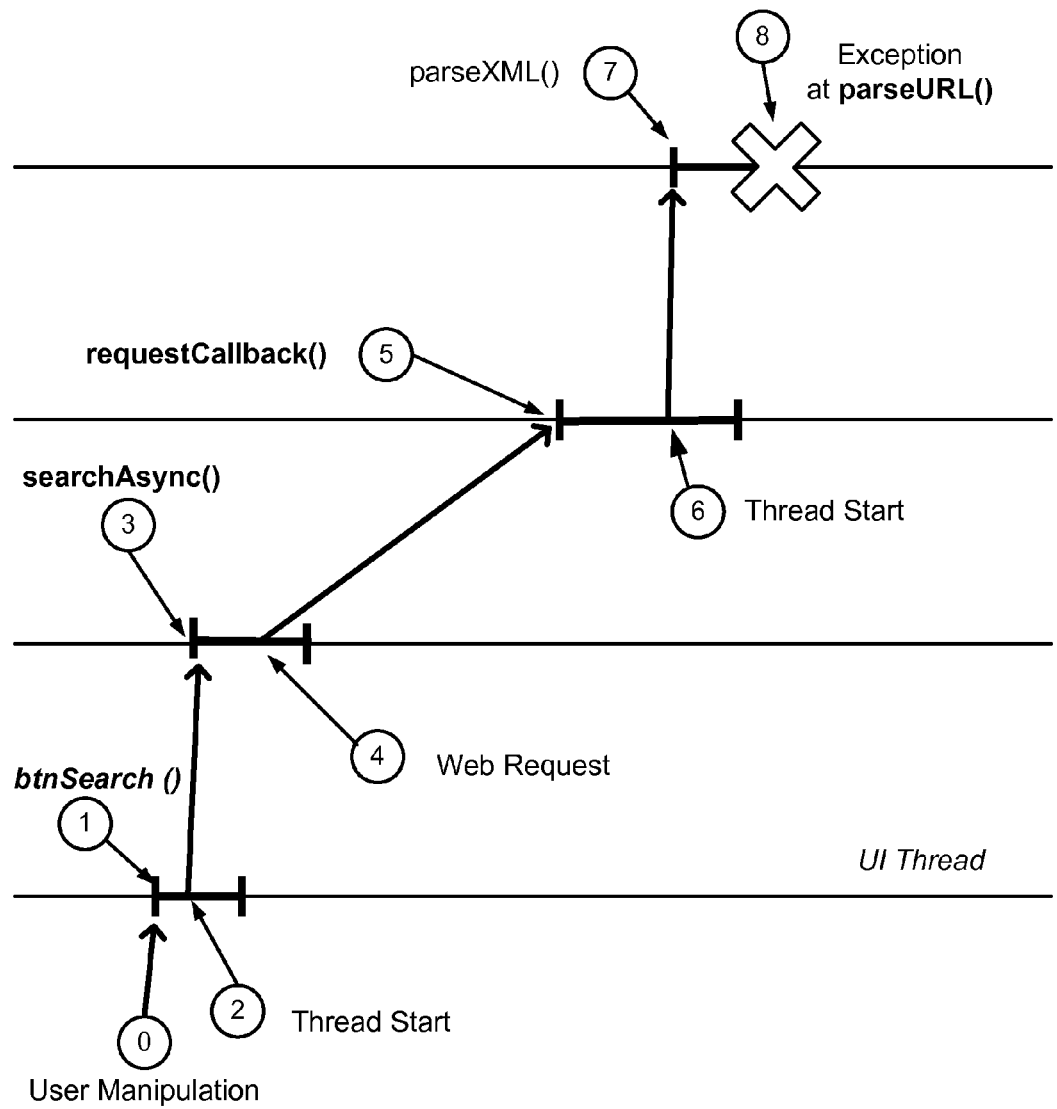
FIG. 5 is an example execution trace showing an example application crash/exception path, according to one or more example embodiments.

FIGS. 3-5 show typical asynchronous programming pattern used in mobile applications. Mobile applications are UI-centric in nature and the UI is managed by a single, dedicated thread in which UI updates, and user interactions with the UI take place on this thread. To maintain UI responsiveness, applications avoid blocking the UI thread as much as possible, and perform most work asynchronously. Some mobile-programming frameworks (e.g., Silverlight®) do not provide synchronous APIs for time-consuming operations like network I/O and location queries. Compute tasks are typically carried out by spawning worker threads. Thus, user requests are processed in a highly asynchronous manner. This is illustrated in FIG. 3, which graphically shows the execution trace for the code snippet in Table 1. In FIG. 3, the horizontal line segments indicate time spent in thread execution, while arrows between line segments indicate causal relationships between threads.

In FIG. 3, the circled numerals (0) through (8) corresponds to the following description:
  (0) the user starts the transaction by clicking a button;
  (1) the OS invokes the event handler (btn-Fetch Click) in the context of the UI thread;
  (2) the handler makes an asynchronous HTTP request, providing reqCallback as the callback;
  (3) the handler quits, freeing the UI thread;
  (4) time is spent downloading the HTTP content;
  (5) when the HTTP request completes, the OS calls reqCallback in a worker thread;
  (6) the worker thread processes the fetched data;
  (7) when the processing finishes, the worker thread invokes the UI Dispatcher, to queue a UI update;
  (8) the OS calls the dispatched function (updateUI) asynchronously on the UI thread, which updates the UI.

In practice, applications are typically much more complex. For example, worker threads may in turn start their own worker threads, some user interactions may start a timer to perform periodic tasks through the lifetime of an application, transactions may be triggered by sensors such as accelerometers, a user may interrupt a running transaction or start another one in parallel, and so forth.

By way of example, FIG. 4 illustrates a pattern common to location-based applications. The application displays information about nearby restaurants and attractions to the user. A typical user transaction goes as follows. Upon user manipulation, the application asks the system to get a GPS fix, and supplies a callback to invoke when the fix is obtained. The system obtains the fix, and invokes the app-supplied callback in a worker thread at (2). The callback function reads the GPS coordinates and makes two parallel web requests to fetch some location-specific data. Then, the thread waits (4), for two completion signals. The wait is indicated via a dotted line. As the two web requests complete, the OS invokes their callbacks at (5) and (7). The first callback signals completion to the blocked thread at (6), while the second one does so at (8). As a result of the second signal, the blocked thread wakes up at (9), and updates the UI via the dispatcher.

Given such complex behavior, it can be difficult for the developers to ascertain where the bottlenecks in the code are and what optimizations might improve user-perceived responsiveness. In FIG. 4, the bottleneck path involves the second web request, which took longer to complete. Note that these bottlenecks may be different for different users, depending on their device, location, network conditions, and usage patterns.

Failure analysis is also complicated by the asynchronous nature of the application. Consider the example in FIG. 5. Suppose the application crashes in the method parseURL( )(8), which is called in a worker thread that started at parseXML( )(7). Because the UI thread function that started the web request has exited, the operating system has no information about the user context for this crash. Thus, in the exception log offered by contemporary popular mobile platforms, the developer only sees a stack trace of the crashed thread, from parseURL( ) to parseXML( ). The developer however, may want more information, such as the user manipulation that triggered the crash, to speed up debugging.

Described herein is a system that (among other advantages) can track user transactions across thread boundaries. The system helps developers understand the performance bottlenecks and failures experienced by their applications in the field. As will be understood, this is accomplished by providing developers with critical paths for user transactions and exception paths when applications fail during a transaction.

Note that in FIG. 3, a user transaction starts when the user manipulation occurs and ends when the updateUI method completes. However, a user transaction need not always end with a UI update. For example, a background task may continue processing past the UI update, without impacting user-perceived latency.

With respect to a critical path, In FIG. 3, the entire path from (0) to (8) constitutes the critical path of the transaction.

The latency can be reduced either by reducing the download delay (4) or the processing delay (6). In FIG. 4, the critical path is shown by the dotted bold arrowed lines. Note that in FIG. 4, activities related to the download and processing of the first web request are not on the critical path (because the web request 2 took the longest). The critical path identifies the portions of the code that directly impacts user-perceived latency.

However, the critical path may not always accurately characterize the user experience. For example, a transaction may make multiple updates to the UI (one after the other), and the user may care about only one of them, or the user may interrupt a transaction to start a new one. Thus, the critical path is useful for understanding performance bottlenecks.

To debug application failures, the system described herein provides the developer exception paths. An exception path is the path from the user manipulation to the exception method, spanning asynchronous boundaries. In FIG. 5, (0) to (8) is the exception path. The exception path points the developer to the user manipulation that started the asynchronous path leading to the crash.

With respect to capturing thread execution, the bold horizontal line segments in FIG. 3 represent when the application code starts and ends executing on each thread. This can be determined from a full execution trace that logs the start and end of every method. However, the overhead of capturing and uploading a full execution trace from a mobile phone is generally prohibitive. Thus, in one aspect, described herein is substantially reducing the overhead by observing that at the beginning of each horizontal line segment in FIG. 3, the top frame in the thread's stack corresponds to an application method (as opposed to a method that is internal to the framework), and observing that this method is the only application method on the stack. These methods are upcalls from the framework into the application code. It is sufficient to log the start and end of only upcalls. The upcalls are generated when the system invokes an application-specified handler (also called callback) method for any of various reasons, for example, to handle user input, timer expiration, sensor triggers, or completion of I/O operations. Note that spawning of worker threads involves upcalls; the application creates a thread, and specifies a method as a start method. This method is invoked as a callback of Thread.Start at some later time.

To instrument the code, potential upcall methods may be identified using a heuristic, namely when a method is specified as a callback to a system call, a reference to the method comprising a function pointer, (called delegate in .NET), is passed to the system call. For example, in Table 1, a reference to reqCallback is passed to the BeginGetResponse system call. The MSIL code for creating a delegate has a fixed format, in which two opcodes are used to push a function pointer onto the stack. Any method that is referenced by these opcodes may be called as an upcall; (note that certain UI handlers are passed to the system differently, and are identified as well).

The system captures the start and end times of potential upcalls, along with the identifiers assigned to them. As shown in Table 2, the instrumentation added for tracking potential upcalls is prepended by '+'. The methods in the example of Table 1 are potential upcalls and thus instrumented (Table 2). While this technique is guaranteed to capture the upcalls, it may instrument more methods than necessary, imposing unnecessary overhead. In practice, this overhead is negligible, compared to the savings achieved.

Turning to matching asynchronous calls to the resulting upcalls, (i.e., their callbacks), by way of example, in FIG. 3, the system needs to match labels two (2) and five (5). To do so, the system needs to identify the call sites where an asynchronous system call was made; e.g., in Table 1, the BeginGetResponse call is an asynchronous system call. The system 102 logs when the callback started executing as an upcall, with the start of upcall execution tracked as described above.

To identify the call sites where an asynchronous system call was made, in general, the system 102 assumes that any system call that accepts a delegate as an argument is an asynchronous call. However, in practice this general heuristic is refined, including by detecting system calls (e.g., using thread identifiers in the trace) that may invoke the supplied callback synchronously. Another refinement is exemplified by the "delayed callback" code in the following table:

TABLE 3

Thread t = new Thread(foo);
...
...
t.Start( );

In this example, the callback delegate foo was specified when the constructor was called, but is invoked only when Thread.Start is called, which may be much later. The general heuristic without refinement incorrectly matches the callback to the call site of the constructor, instead of Thread.Start. However, domain knowledge about the framework (e.g., Silverlight®) system libraries may be used, e.g., by knowing that the callback function is always invoked from Thread.Start. The system logs the identifier of the thread object at the constructor, and also at Thread.Start. The object identifiers and the detour log described herein allow matching the callback to the Thread.Start call. Event subscriptions may be similarly handled.

The system further needs to connect the beginning of callback execution to the corresponding asynchronous call. Note that a single callback function (e.g., a completion handler for a web request) may be specified as a callback for several asynchronous system calls. Rewriting the application code to clone the callback function several times and assigning unique identifiers is not sufficient, because the asynchronous call may be called in a loop (e.g., for each URL in a list, start download) specifying the same function as a callback. To handle such scenarios, the callback methods are written to detour them through the detour library 226; relevant detour code is shown in the following table, Table 4.

TABLE 4

```
public class DetourFactory {
    ...
    public static Detour GetDetour(
            Delegate d, int callId) {
        int matchId = getUniqueId( );
        Logger.LogAsyncStart(callId, matchId);
        return new Detour(d, matchId);
    }
}
public class Detour {
    int matchId; Delegate originalCb;
    public Detour(Delegate d, int matchId) {
        this.originalCb = d; this.matchId = matchId;
    }
    public void Cb1(IAsyncResult result) {
        Logger.LogCallbackStart(this.matchId);
        Invoke(this.originalCb);
    }
    public void Cb2( ) {
        ...
    }
}
```

Note that in the instrumented code (Table 2), instrumentation used for detour is tagged with '*' (an asterisk).

Figure 6:
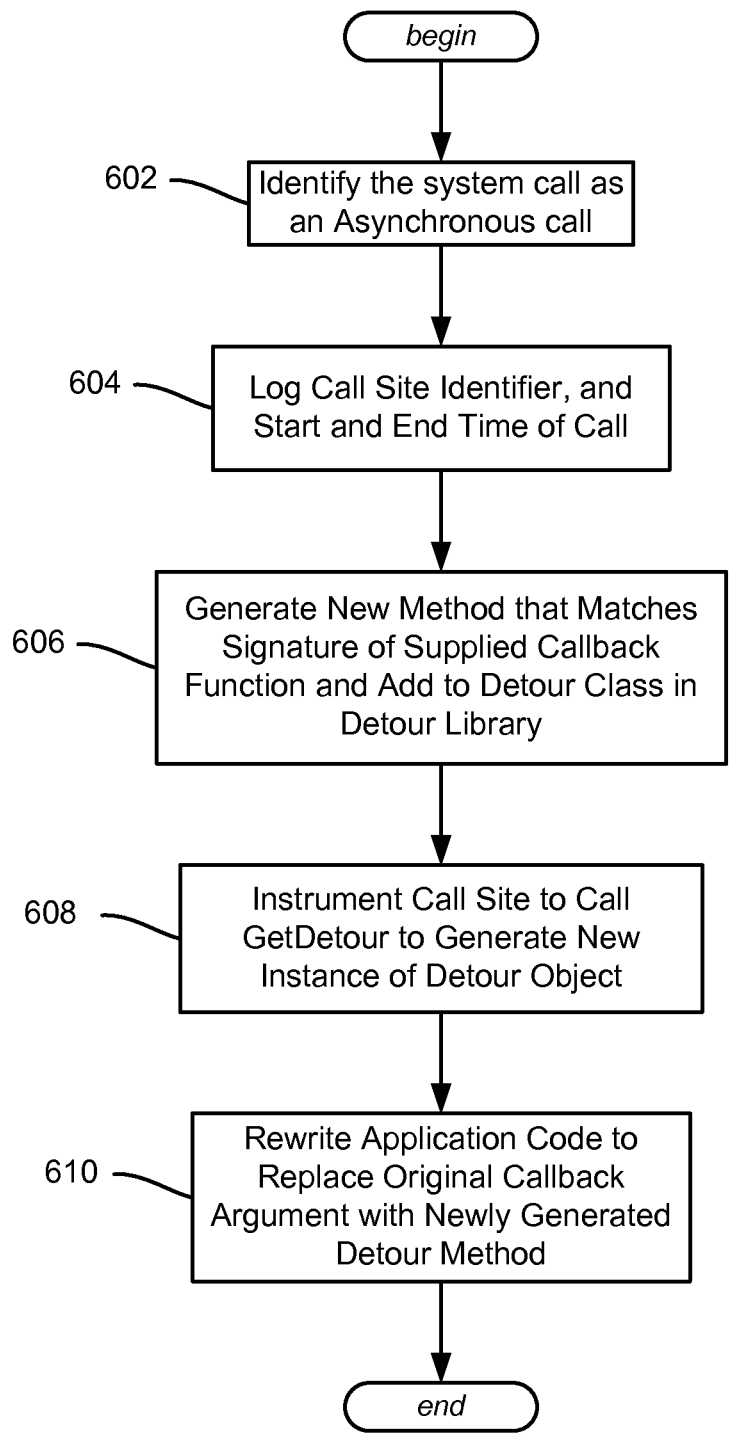
FIG. 6 is a flow diagram showing example steps related to matching an asynchronous call with a corresponding callback, according to one or more example embodiments.

Instrumentation may be added as follows, and as shown in FIG. 6:

(Steps 602 and 604) Identify the system call BeginGetResponse as an asynchronous call. In this example, consider that the instrumenter has assigned a call identifier of 7 to this call site. The system logs the call site identifier, and the start and end time of the call (step 604).

(Step 606) Generate a new method (e.g., referred to as cb1) that matches the signature of the supplied callback function, i.e., reqCallback, and add it to the Detour class in the Detour library. This method is responsible for invoking the original callback (Table 6).

(Step 608) Instrument the call site to call GetDetour to generate a new instance of the Detour object. This object stores the original callback, and is assigned a unique ID (called matchId) at runtime. This matchId helps match the asynchronous call to the callback.

(Step 610) Rewrite the application code to replace the original callback argument with the newly generated detour method, Detour.cb1.

Figure 7:
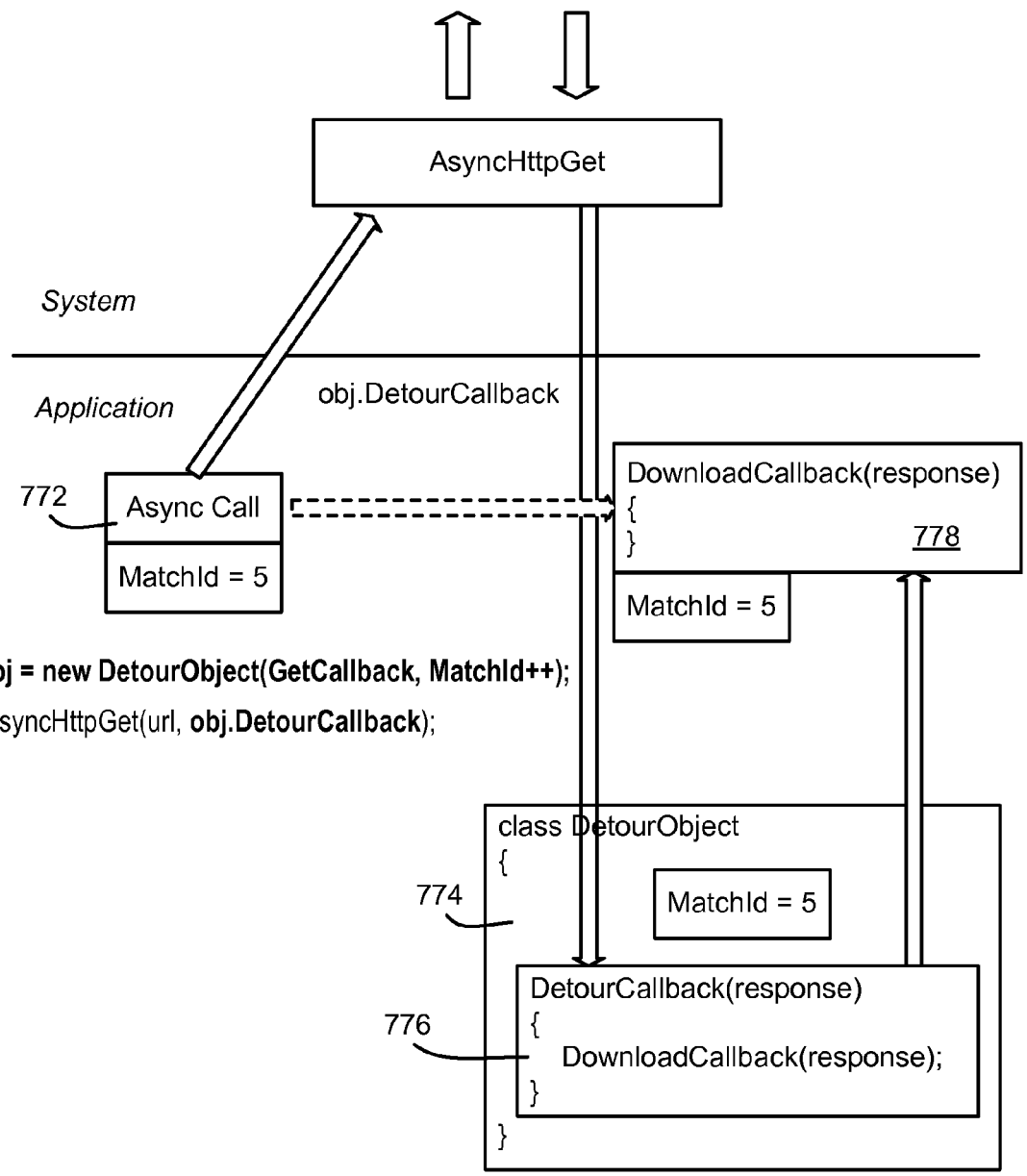
FIG. 7 is a representation of one example way in which an asynchronous call may be detoured for matching the call with a corresponding callback, according to one or more example embodiments.

During execution of the instrumented code, the detour code is called as generally represented in FIG. 7. Via instrumentation, the asynchronous call 772 is configured so that the callback is to the DetourObject 774, with the asynchronous call 772 associated with a MatchId. The callback is to DetourCallback 776 of DetourObject 774, which matches the callback to the call based upon the associated MatchId. From the detour object, the callback DownloadCallback (response) 778 proceeds as usual from the asynchronous call's perspective, but (via the detour) the logging-related information is known to be associated with this asynchronous call.

Note from Table 4 that the GetDetour method logs the beginning of an asynchronous call using the LogAsyncStart function of the Logger library. Similarly, the beginning of the callback is logged by the LogCallbackStart, which is called from cb1, just before the original callback is invoked. These records, and the UpcallStart record of the original callback method are linked by the matchId, the call site ID, and their thread IDs, allowing the system to attribute the callback to the correct asynchronous call.

Table 4 also shows another example of detouring. The UpdateUI method is a callback for the BeginInvoke method of the UIDispatcher, and hence is detoured.

A trace generated by the instrumented code in Table 2 is shown in a series of records in Table 5.

TABLE 5

| RecordId | Records | ThreadId |
| --- | --- | --- |
| 1 | UIManipulationStarted | 0 |
| 2 | MethodStart(5) | 0 |
| 3 | CallStart(7) | 0 |
| 4 | AsyncStart(7, 1) | 0 |
| 5 | CallEnd(7) | 0 |
| 6 | MethodEnd(5) | 0 |
| 7 | UIManipulationEnded | 0 |
| 8 | CallbackStart(1) | 1 |
| 9 | MethodStart(19) | 1 |
| 10 | CallStart(13) | 1 |
| 11 | AsyncStart(13, 2) | 1 |
| 12 | CallEnd(13) | 1 |
| 13 | MethodEnd(19) | 1 |
| 14 | CallbackStart(2) | 0 |
| 15 | MethodStart(21) | 0 |
| 16 | MethodEnd(21) | 0 |
| 17 | LayoutUpdated | 0 |

Table 5 shows the trace generated by the instrumented code in Table 2. Records 1 and 7 show a UI Manipulation event. These records encompass an upcall (records 2-6) to the method btnFetch Click. As described above, this upcall is attributed to UI manipulation. This method makes the asynchronous system call BeginGetResponse (record 4), the callback of which is detoured, and assigned a match ID of 1. Record 8 marks the beginning of the execution of the detoured callback, and calls the actual callback method, reqCallback, which has a method ID of 19. This method executes between records 9 and 13. Records 8 and 9 may be linked because they have the same thread ID, and follow each other.

When reqCallback executes, another asynchronous call is made, namely a call to the UI dispatcher. The callback is detoured, and assigned a match ID of 2. The actual callback method is UpdateUI, which has the method ID of 21.

The completion of this method is indicated by record 16. Note that this method ran on the UI thread. Record 17 indicates that a LayoutUpdated event was triggered immediately after the execution of this method, which means that this method updated the UI.

In one implementation, the framework provides a set of methods for thread synchronization. The thread waits on a semaphore (e.g., Monitor.Wait(obj)), and is woken up by signaling that semaphore (e.g., Monitor.Pulse(obj)). Calls to these functions, and the identities of semaphore objects they use, are logged. The object identifiers can be used to determine the causal relationship between synchronization calls. Waiting on multiple objects, and thread join calls are handled similarly. Threads can also synchronize using shared variables as described below.

With respect to capturing UI updates, in one implementation, the framework generates a LayoutUpdated event whenever the application finishes updating the UI. In one implementation, if an upcall runs on the UI thread (either event handlers, or application methods called via the UIDispatcher), and updates one or more elements of the UI as part of its execution, then a single LayoutUpdated event is raised when the upcall ends. The Logger library exports a handler for this event, which is added to the application code. The handler logs the time this event was raised.

When an unhandled exception occurs in the application code, the system terminates the application. Before terminating, the system delivers a special event to the application. The data associated with this event contains the exception type and the stack trace of the thread in which the exception occurred. To log this data, the logger library exports a handler for this event, which is added to the application code.

Turning to analysis aspects, the traces are analyzed to delineate individual user transactions, and to identify critical paths and exception paths. Transactions can also be analyzed in aggregate, to highlight broader trends.

User transactions are represented by directed acyclic graphs. The graph is generated from the trace data. Consider the trace in Table 5, which may be converted to the graph in FIG. 8A. The graph contains five types of nodes, namely: (M) User Manipulation, (S) Upcall start, (E) Upcall end, (A) Async call start, and (L) Layout updated. Each node represents one trace record (CallStart, CallEnd and CallBackStart records are used for bookkeeping, and are not mapped to nodes) and is identified by the type and the record id. The mapping between node types M, S, E, A and L and the record types can be determined from Table 5. The edges between nodes represent causal relationships. For example, the UIManipulationStarted event M1 triggers the start of the handler S2. Similarly, the start of callback execution S9 was caused by the asynchronous call A4. An upcall start node "causes" any subsequent activity on that upcall. Hence shown are S2→A4, as the asynchronous call was made during execution of the upcall, and S2→E6, to represent the fact that the upcall end is triggered by upcall start. Note that the graph in FIG. 8A does not show any thread synchronization events; these are represented by three types of nodes, namely (B) Thread blocked node, (F) Semaphore fired node, and (W) Thread wakeup node, which are described below with reference to FIG. 8B.

When the application trace contains overlapping user transactions, this approach correctly separates them, and generates a graph for each. Data corresponding to this graph representation may be used to discover the critical path in a user transaction.

Figure 8A:
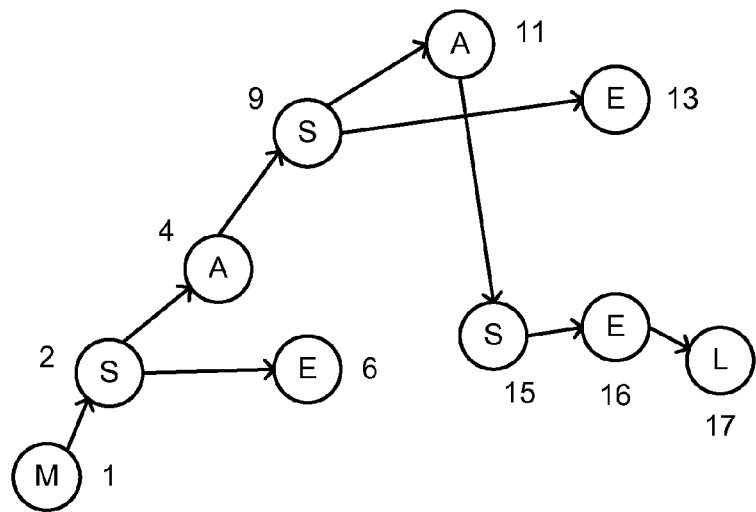
FIGS. 8A and 8B are representations of directed acyclic graphs processed from logged trace data to represent user transactions, according to one or more example embodiments.
Figure 8B:
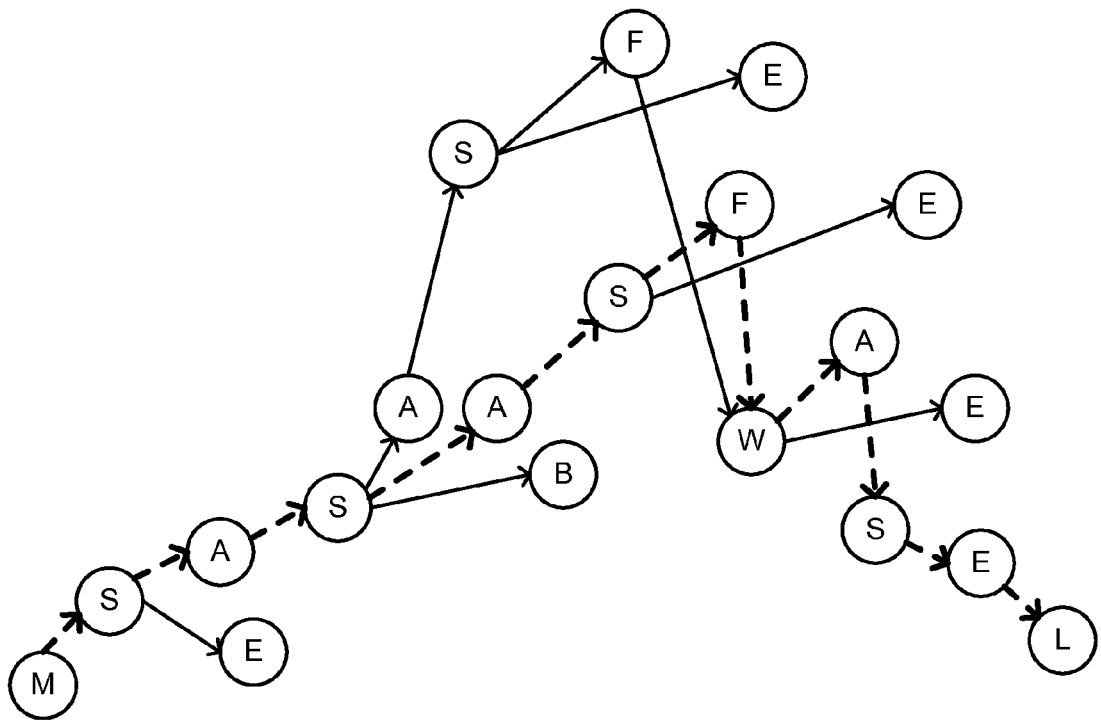

As described above, the critical path is the bottleneck path in the user transaction. An algorithm for finding the critical path is straightforward, as generally exemplified in FIG. 8A. The analysis component 118 (FIG. 1) traverses the graph backwards, going from the last UI update (L17), to the user manipulation event that signals the start of the transaction (M1), traversing each directed edge in the opposite direction. This path, when reversed, yields the critical path: M1, S2, A4, S9, A11, S15, E16, L17. The example in FIG. 8A shows that the system correctly accounts for time spent inside upcalls, e.g., the edge (S9, E13) is not on the critical path, which means that any activity in the reqCallback method (Table 2), after calling the dispatcher, does not affect user-perceived latency. Note that refinements to this algorithm are discussed herein.

The transaction may update the UI multiple times. This results in multiple L nodes in the transaction graph. Only the developer can accurately determine which of these updates is significant. In such cases, the instrumentation system, by default, reports the critical path to the last L node. However, using a feedback interface or the like, the developer can ask the instrumentation system to generate the critical path to any of the L nodes.

Thread synchronization via signaling is another aspect. The above algorithm implicitly assumes that each node has only one edge incident upon it. This is not the case for the graph shown in FIG. 8B, which represents the transaction shown in FIG. 8B. Node W, which is a thread wakeup node, has two edges incident upon it, because the thread was waiting for two semaphores to fire (the two F nodes). In such cases, the system compares the timestamps of the semaphore-fire records, and picks the later event. This yields the critical path shown in FIG. 8B by the bold dashed lines.

Note that an application may start a periodic timer, which fires at regular intervals and performs various tasks, including UI updates. In some cases, periodic timers can also be used for thread synchronization. This pattern may be detected by the system, and then assume each timer firing to be the start of a separate transaction. These transactions are timer transactions, to distinguish them from user transactions. These transactions may not end with UI updates. Sensor-driven transactions are handled in a similar manner.

When the application crashes, the system logs the exception information including the stack trace of the thread that crashed. The instrumentation mechanism-generated trace is known until that point. The system walks the stack frames until a frame is found that contains the method name of the last UpcallStart record in the instrumentation mechanism trace. The path from the start of the transaction to the Upcall start node, combined with the stack trace represents the exception path.

The instrumentation mechanism may help the developer see a "big picture" by analyzing the transactions in aggregate. There are various ways to look at the aggregate data. For example, developers may benefit by using the aggregate data to uncover the root causes of performance variability, and to discover "outliers"—e.g., transactions that took abnormally long to complete compared to similar transactions. To perform this analysis, transactions with identical graphs may be grouped together, e.g., those having the same nodes and the same connectivity. These transactions represent the same user interaction with the application. This is a conservative grouping; the same user interaction may occasionally generate different transaction graphs, but if two transactions have the same graph, with a high probability they correspond to the same interaction.

While the transactions in a group have the same transaction graph, their critical paths and durations can differ. To identify the major sources behind this variability, a standard statistical technique called Analysis of Variance (ANOVA) may be used to help understand performance variance. ANOVA quantifies the amount of variance in a measure that can be attributed to individual factors that contribute to the measure. Factors may include network transfer, local processing and GPS queries which in turn can vary because of network type, device type, GPS state, user state, and so forth.

The system described herein also may flag outlier transactions to help developers identify performance bottlenecks. For example, transactions with duration greater than (mean+ (k*standard deviation)) in the group may be marked as outliers; k=3 in one implementation.

Figure 9:
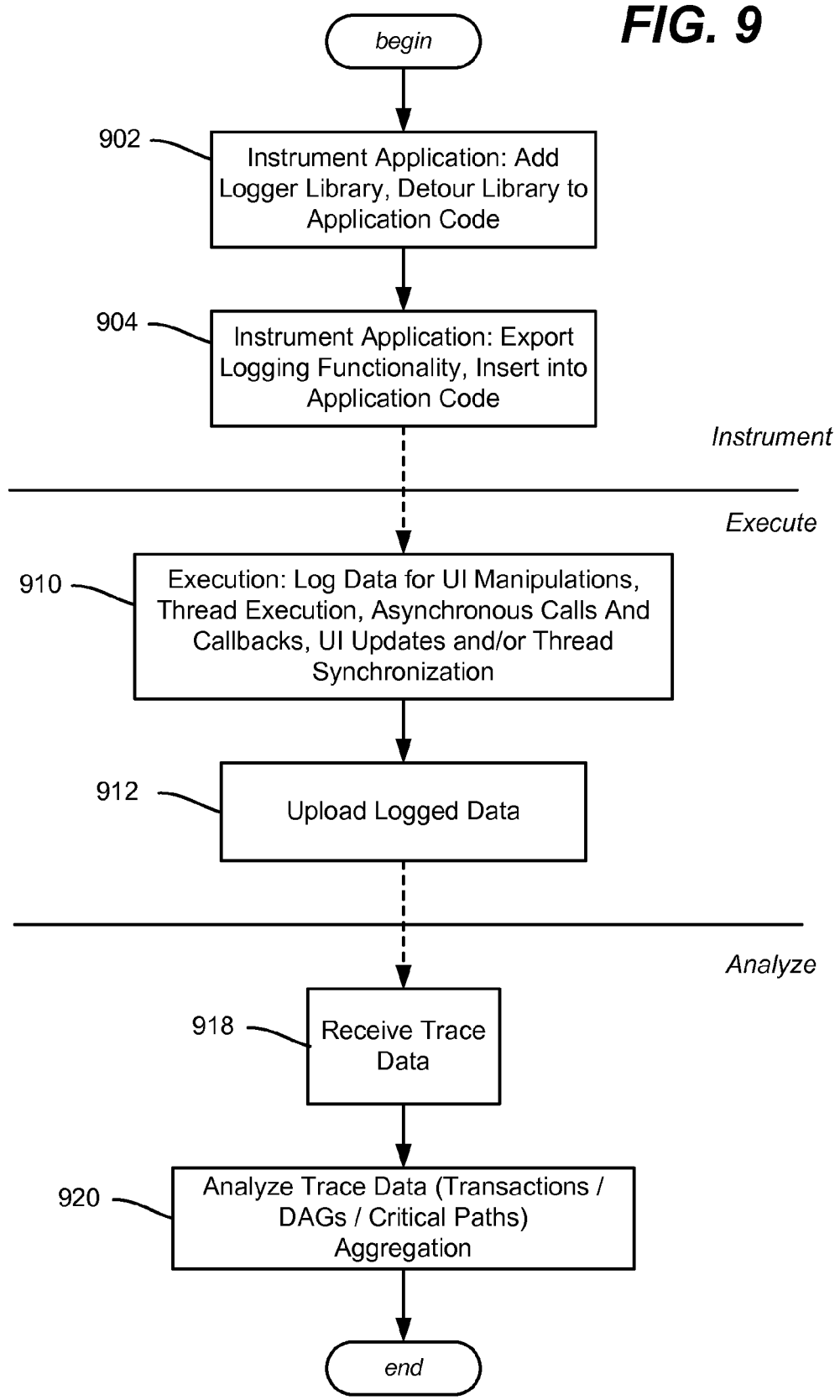
FIG. 9 is a flow diagram showing example steps that may be taken to instrument code, execute the instrumented code to collect trace data for analysis, and analyze the trace data, according to one or more example embodiments.

FIG. 9 is a summarization of example steps including instrumentation, execution and analysis steps performed by the instrumentation and analysis system. Note that the instrumentation, execution and analysis are indirectly connected, e.g., a user may not download and/or execute an instance of an instrumented application for a long time (e.g., days, weeks, months and so on) after instrumentation, and analysis may occur a long time after execution. Steps 902 and 904 are directed to instrumenting the application code, including adding the libraries (step 902) and exporting the logging functions and event handlers (step 904).

Steps 910 and 912 are directed towards execution steps. As described herein, during execution, the instrumented code logs data related to UI manipulations, thread execution, asynchronous calls and callbacks, UI updates and/or thread synchronization. Asynchronous calls and callbacks are detoured to correctly associate the call with the callback as described herein. Step 912 represents uploading the logged (trace) data to a server for subsequent analysis.

Steps 918 and 920 are directed to the analysis of the trace data, including receiving the trace data (which may be stored for later analysis). Analysis is represented by step 920, and includes concepts such as determining transactions, representing the transactions as directed acyclic graphs (DAGs), and determining critical paths for the transactions. Aggregation also may be performed to give the developer a "big picture" as described herein.

Example Operating Environment

Figure 10:
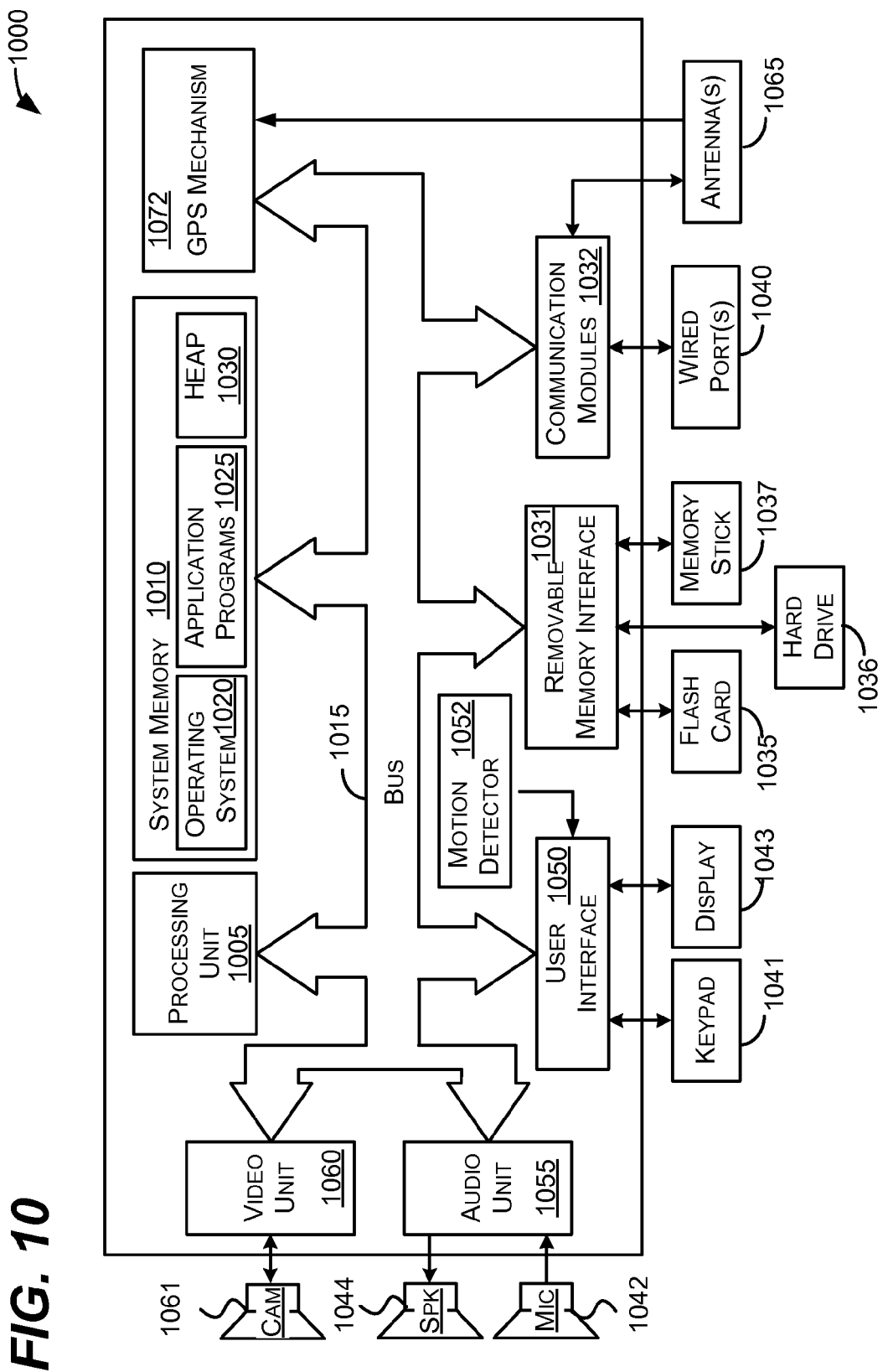
FIG. 10 is a block diagram representing an example computing environment in the form of a mobile computing device into which aspects of the subject matter described herein may be incorporated.

FIG. 10 illustrates an example of a suitable mobile device 1000 on which aspects of the subject matter described herein may be implemented. The mobile device 1000 is only one example of a device and is not intended to suggest any limitation as to the scope of use or functionality of aspects of the subject matter described herein. Neither should the mobile device 1000 be interpreted as having any dependency or requirement relating to any one or combination of components illustrated in the example mobile device 1000.

With reference to FIG. 10, an example device for implementing aspects of the subject matter described herein includes a mobile device 1000. In some embodiments, the mobile device 1000 comprises a cell phone, a handheld device that allows voice communications with others, some other voice communications device, or the like. In these embodiments, the mobile device 1000 may be equipped with a camera for taking pictures, although this may not be required in other embodiments. In other embodiments, the mobile device 1000 may comprise a personal digital assistant (PDA), hand-held gaming device, notebook computer, printer, appliance including a set-top, media center, or other appliance, other mobile devices, or the like. In yet other embodiments, the mobile device 1000 may comprise devices that are generally considered non-mobile such as personal computers, servers, or the like.

Components of the mobile device 1000 may include, but are not limited to, a processing unit 1005, system memory 1010, and a bus 1015 that couples various system components including the system memory 1010 to the processing unit 1005. The bus 1015 may include any of several types of bus structures including a memory bus, memory controller, a peripheral bus, and a local bus using any of a variety of bus architectures, and the like. The bus 1015 allows data to be transmitted between various components of the mobile device 1000.

The mobile device 1000 may include a variety of computer-readable media. Computer-readable media can be any available media that can be accessed by the mobile device 1000 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 1000.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, Wi-Fi, WiMAX, and other wireless media. Combinations of any of the above should also be included within the scope of computer-readable media.

The system memory 1010 includes computer storage media in the form of volatile and/or nonvolatile memory and may include read only memory (ROM) and random access memory (RAM). On a mobile device such as a cell phone, operating system code 1020 is sometimes included in ROM although, in other embodiments, this is not required. Similarly, application programs 1025 are often placed in RAM although again, in other embodiments, application programs may be placed in ROM or in other computer-readable memory. The heap 1030 provides memory for state associated with the operating system 1020 and the application programs 1025. For example, the operating system 1020 and application programs 1025 may store variables and data structures in the heap 1030 during their operations.

The mobile device 1000 may also include other removable/non-removable, volatile/nonvolatile memory. By way of example, FIG. 10 illustrates a flash card 1035, a hard disk drive 1036, and a memory stick 1037. The hard disk drive 1036 may be miniaturized to fit in a memory slot, for example. The mobile device 1000 may interface with these types of non-volatile removable memory via a removable memory interface 1031, or may be connected via a universal serial bus (USB), IEEE 10394, one or more of the wired port(s) 1040, or antenna(s) 1065. In these embodiments, the removable memory devices 1035-437 may interface with the mobile device via the communications module(s) 1032. In some embodiments, not all of these types of memory may be included on a single mobile device. In other embodiments, one or more of these and other types of removable memory may be included on a single mobile device.

In some embodiments, the hard disk drive 1036 may be connected in such a way as to be more permanently attached to the mobile device 1000. For example, the hard disk drive 1036 may be connected to an interface such as parallel advanced technology attachment (PATA), serial advanced technology attachment (SATA) or otherwise, which may be connected to the bus 1015. In such embodiments, removing the hard drive may involve removing a cover of the mobile device 1000 and removing screws or other fasteners that connect the hard drive 1036 to support structures within the mobile device 1000.

The removable memory devices 1035-1037 and their associated computer storage media, discussed above and illustrated in FIG. 10, provide storage of computer-readable instructions, program modules, data structures, and other data for the mobile device 1000. For example, the removable memory device or devices 1035-1037 may store images taken by the mobile device 1000, voice recordings, contact information, programs, data for the programs and so forth.

A user may enter commands and information into the mobile device 1000 through input devices such as a key pad 1041 and the microphone 1042. In some embodiments, the display 1043 may be touch-sensitive screen and may allow a user to enter commands and information thereon. The key pad 1041 and display 1043 may be connected to the processing unit 1005 through a user input interface 1050 that is coupled to the bus 1015, but may also be connected by other interface and bus structures, such as the communications module(s) 1032 and wired port(s) 1040. Motion detection 1052 can be used to determine gestures made with the device 1000.

A user may communicate with other users via speaking into the microphone 1042 and via text messages that are entered on the key pad 1041 or a touch sensitive display 1043, for example. The audio unit 1055 may provide electrical signals to drive the speaker 1044 as well as receive and digitize audio signals received from the microphone 1042.

The mobile device 1000 may include a video unit 1060 that provides signals to drive a camera 1061. The video unit 1060 may also receive images obtained by the camera 1061 and provide these images to the processing unit 1005 and/or memory included on the mobile device 1000. The images obtained by the camera 1061 may comprise video, one or more images that do not form a video, or some combination thereof.

The communication module(s) 1032 may provide signals to and receive signals from one or more antenna(s) 1065. One of the antenna(s) 1065 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 1072. In turn, the GPS mechanism 1072 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 1000 may connect to one or more remote devices. The remote devices may include a personal computer, a server, a router, a network PC, a cell phone, a media playback device, a peer device or other common network node, and typically includes many or all of the elements described above relative to the mobile device 1000.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server may be used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method for automatically instrumenting application code for collecting information during actual use of the application code by field users, the method comprising:

inserting one or more logging functions and one or more event handlers into the application code to log events during an execution of the application;

automatically inserting code into the application code to assign an identifier for an invocation of an asynchronous call to detour a callback corresponding to the asynchronous call that is made during actual use of the application code in the field to detour code, the detour code being executed to associate the callback with the asynchronous call based upon the identifier; and upon logging the data during execution of the application, matching the asynchronous call to the corresponding callback by:

identifying a call site where the asynchronous call was made;

assigning a call site identifier to the call site;

logging the call site identifier when the callback started executing as an upcall; and associating a beginning of an execution of the callback to the asynchronous call.

2. The method of claim 1, wherein inserting the one or more logging functions and the one or more event handlers into the application code comprises adding a logger library to the application code that exports one or more logging functions and one or more event handlers.

3. The method of claim 1 further comprising adding a detour library to provide the detour code.

4. The method of claim 1 further comprising logging events for a user transaction.

5. The method of claim 4 further comprising analyzing the user transaction, including identifying a critical path therein.

6. The method of claim 5 further comprising;

representing the user transaction as a directed acyclic graph, and wherein identifying the critical path comprises processing the directed acyclic graph.

7. The method of claim 1 further comprising logging events including timing information related to at least one of the events.

8. The method of claim 1 further comprising tracking an exception path.

9. The method of claim 1 wherein logging events during the execution of the application comprises logging at least one of: user interface (UI) manipulations, thread execution, asynchronous calls and callbacks, UI updates or thread synchronization.

10. The method of claim 9 wherein logging thread execution comprises identifying upcalls.

11. A system comprising a processor programmed to:

automatically instrument application code with logging functionality and with code that associates asynchronous calls with callbacks;

process data logged during execution of the application code during actual usage by field users via the logging functionality into directed acyclic graphs representing one or more transactions that occurred during execution;

upon logging the data during execution of the application code, matching the asynchronous call to a corresponding callback by:

identifying a call site where the asynchronous call was made;

assigning a call site identifier to the call site;

logging the call site identifier when the callback started executing as an upcall; and associating a beginning of an execution of the callback to the asynchronous call.

12. The system of claim 11 wherein the processor is further programmed to process at least one of the directed acyclic graphs to determine a critical path.

13. The system of claim 11 wherein the processor is further programmed to process logged data into an exception path.

14. The system of claim 11 wherein the processor is further programmed to log data related to at least one of:
a user transaction, a timer transaction, or a sensor-driven transaction.

15. The system of claim 11 wherein the processor is further programmed to log data related to at least one of:
user interface (UI) manipulation, thread execution, asynchronous calls and callbacks, UI updates, or thread synchronization.

16. The system of claim 11 wherein the application code is executable on one or more of the following: a smartphone and a tablet computer.

17. One or more hardware machine-readable storage devices having executable instructions that perform operations comprising:
executing instrumented application code;
logging data via the instrumented application code, the data collected during actual execution of the instrumented application code by field users, the data corresponding to asynchronous calls and callbacks and one or more of the following: user interface (UI) manipulations, thread execution, and UI updates or thread synchronization;
upon logging the data using the instrumented application code, matching the asynchronous call to a corresponding callback by:
identifying a call site where the asynchronous call was made;
assigning a call site identifier to the call site;
logging the call site identifier when the callback started executing as an upcall; and
associating a beginning of an execution of the callback to the asynchronous call; and
uploading the data for analysis processing.

18. The one or more hardware machine-readable storage devices of claim 17 wherein matching the asynchronous call to the corresponding callback comprises:
instrumenting the asynchronous call to assign an unique identifier and detour the callback provided to the asynchronous call to call back to detour code; and
associating the callback with the asynchronous call via the identifier.

19. The one or more hardware machine-readable storage devices of claim 17 having further executable instructions comprising:
processing transactions logged within the data into directed acyclic graphs; and
determining a critical path for a transaction by processing the directed acyclic graphs.

20. The one or more hardware machine-readable storage devices of wherein the data corresponds to two or more of the following:
UI manipulations, thread execution, and UI updates or thread synchronization.

* * * * *